(12) United States Patent
Yee (10) Patent No.: US 8,503,494 B2
(45) Date of Patent: Aug. 6, 2013

(54) THERMAL MANAGEMENT SYSTEM

(75) Inventor: Dawson Yee, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 13/080,549

(22) Filed: Apr. 5, 2011

(65) Prior Publication Data

US 2012/0257646 A1 Oct. 11, 2012

(51) Int. Cl.
*H01S 3/04* (2006.01)

(52) U.S. Cl.
USPC .................... 372/36; 372/34; 372/35; 372/37

(58) Field of Classification Search
USPC ...................................................... 372/34–36
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,088,098 A | 2/1992 | Muller et al. |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

"International Search Report", Mailed Date: Oct. 29, 2012, Application No. PCT/US2012/030218, Filed Date: Mar. 23, 2012, pp. 1-9.

(Continued)

*Primary Examiner* — Dung Nguyen
(74) *Attorney, Agent, or Firm* — Alleman Hall McCoy Russell & Tuttle LLP (57) ABSTRACT

Various embodiments are disclosed for a thermal management system and related method for selectively thermally isolating and thermally connecting a target component. One embodiment of a system includes a first component having a first surface proximate to a target component, and an electromagnet between the first surface and the target component. A second component is spaced apart from the first component to form a gap that serves as a thermal boundary between the first component and the second component. A carrier fluid disposed within the gap includes multiple thermally conductive, ferrous particles. The carrier fluid is configured to align at least a portion of the thermally conductive, ferrous particles when the electromagnet generates a magnetic field that attracts the particles, and to displace at least a portion of the particles when the electromagnet generates a magnetic field that repels the particles.

20 Claims, 4 Drawing Sheets

(56) References Cited

U.S. PATENT DOCUMENTS

| | | |
|---|---|---|
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,518,560 A | 5/1996 | Li |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,676,508 B1 | 1/2004 | Graham |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,828,889 B1 * | 12/2004 | Zaput ............................ 335/216 |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,509 B2 * | 3/2010 | Neal ............................ 310/54 |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |

| | | | |
|---|---|---|---|
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2006/0018098 | A1* | 1/2006 | Hill et al. .................. 361/708 |
| 2007/0039721 | A1 | 2/2007 | Murray |
| 2008/0026838 | A1 | 1/2008 | Dunstan et al. |
| 2008/0264068 | A1 | 10/2008 | Nakasuka et al. |
| 2009/0213975 | A1 | 8/2009 | Sturt |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Verdoold, et al., "Towards electromagnetic control of thermal convection", Retrieved at <<http://www3.imperial.ac.uk/pls/portallive/docs/1/3249918.PDF >>, 7th International Symposium on fluid control, Measurement and Visualisation, FLUCOME, 2003, pp. 1-9.

"Laser diode Cooling", Retrieved at <<http://www.nextreme.com/pages/temp_control/apps/laser_diodes.shtml >>, Retrieved Date: Jan. 28, 2011, p. 1.

* cited by examiner

THERMAL MANAGEMENT SYSTEM

BACKGROUND

Electronic components may be designed to operate within a desired temperature range between an upper and a lower target temperature. For example, one input device for a gaming system is a depth camera. Depth cameras typically include an illumination system with a light source to illuminate an object with illumination light. For efficient operation, the light source should be maintained within a desired temperature range.

Some approaches to maintaining a desired temperature range in an electronic component include utilizing thermal management devices, such as cooling fans or thermoelectric coolers (TECs). However, such thermal management devices may be expensive and may require an amount of packaging space that is undesirable in certain electronic systems, such as gaming systems. Further, these and other approaches to maintaining a desired temperature range may provide either a heating or cooling effect to an electronic component, but may be less effective at thermally isolating the component.

SUMMARY

Various embodiments are disclosed for a thermal management system that selectively thermally isolates and thermally connects a target component. In one embodiment, the thermal management system includes a first component having a first surface that is proximate to the target component. An electromagnet is positioned between the first surface and the target component. A second component is spaced apart from the first component to create a gap between the first and second components that serves as a thermal boundary between the components. A carrier fluid is disposed within the gap and includes multiple thermally conductive, ferrous particles.

When the electromagnet generates a magnetic field that attracts the thermally conductive, ferrous particles, the carrier fluid is configured to align at least a portion of the particles across a central region of the gap. Conversely, when the electromagnet generates a magnetic field that repels the particles, the carrier fluid is configured to displace at least a portion of the particles from a central region of the gap. In this manner, the thermal management system operates to selectively thermally connect and thermally isolate the first and second components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
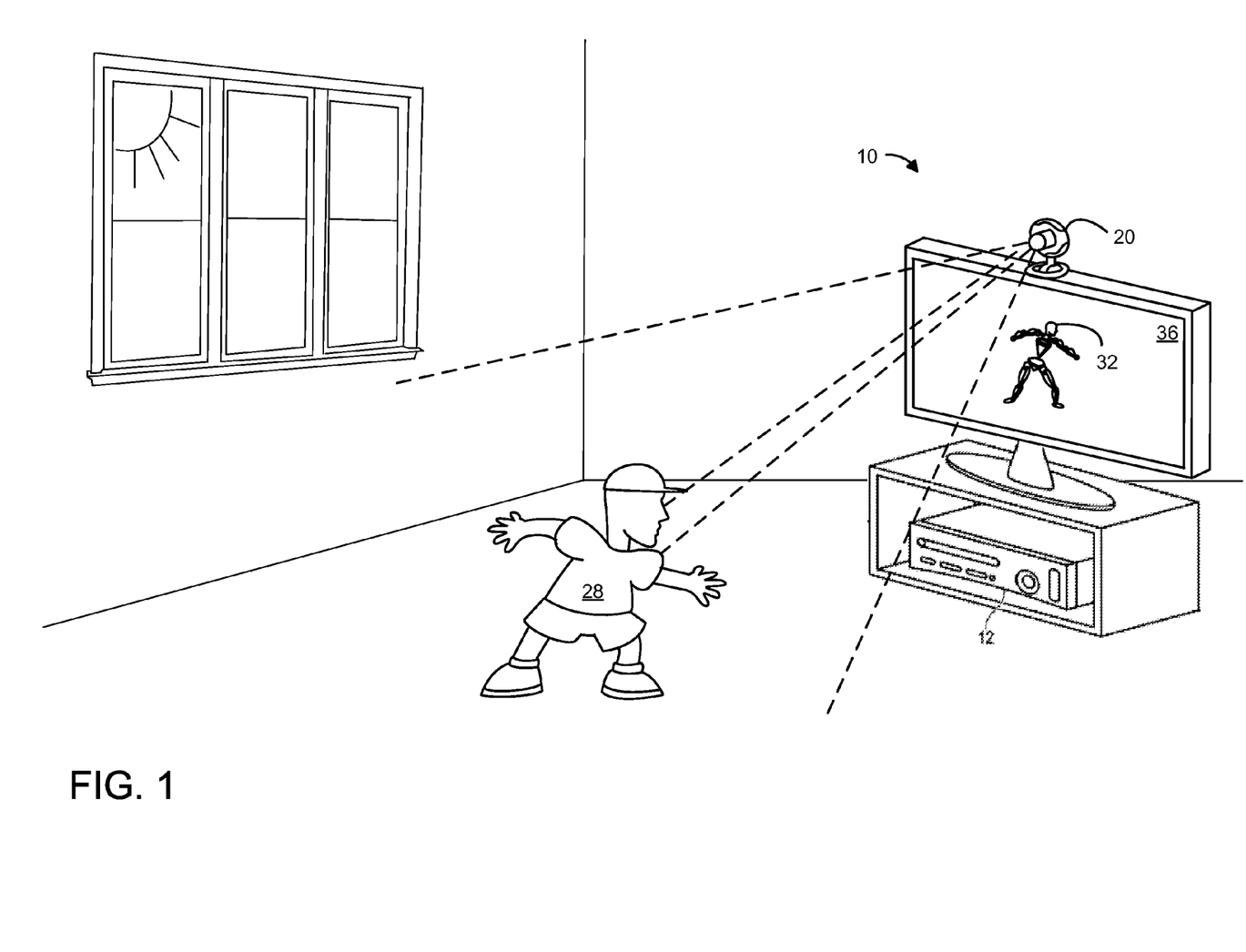
FIG. 1 is a schematic view of a gaming system including a computing device and an associated depth camera that includes a thermal management system according to an embodiment of the present disclosure.

Aspects of this disclosure will now be described by example and with reference to the illustrated embodiments listed above. FIG. 1 schematically shows an example of a gaming system 10 that includes a computing device 12, such as a game console, and associated depth camera 20 with which a thermal management system according to an embodiment of the present disclosure may be utilized. The depth camera 20 emits light that illuminates an object, such as person 28, and senses reflected illuminated light at a light sensor. An imaging system within the depth camera 20 or computing device 12 is configured to generate an object image based on the reflected light that is captured. The object image may be used to present a graphical representation 32 of the illuminated object on a display 36.

Figure 2:
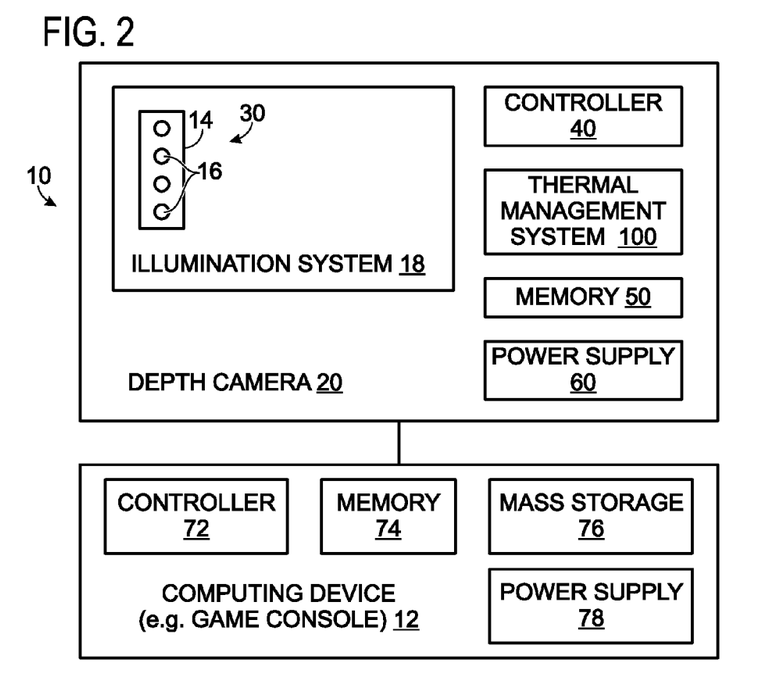
FIG. 2 is a schematic view of the depth camera and the computing device of FIG. 1 showing components of the depth camera and computing device according to an embodiment of the present disclosure.

FIG. 2 schematically shows components of the depth camera 20 and computing device 12 of FIG. 1. In one example depth camera 20 includes a controller 40, memory 50 and power supply 60. Depth camera 20 also includes a light source 14 that is disposed within an illumination system 18. As described in more detail below, the depth camera 20 further includes a thermal management system 100 according to an embodiment of the present disclosure for selectively thermally isolating and thermally connecting a target component 30, such the light source 14. The illumination system 18 may control the light source 14 to illuminate an object, such as the person 28 in FIG. 1. In some examples, the illumination light may be structured light used to provide an interference pattern that is analyzed to determine three-dimensional information. In some other examples, the illumination light may be pulsed light used to provide a basis for time-of-flight measurements to determine three-dimensional information.

In one example, the light source 14 may include an array of light emitting laser diodes 16 that are controlled to emit pulses of light at one or more wavelengths. It will be appreciated the light emitting laser diodes 16 generate heat, and that varying the operating temperature of the light emitting diodes 16 will also vary the emission wavelength of the emitted light. Increasing the operating temperature of the laser diode results in a corresponding increase in the wavelength of the emitted light. Conversely, decreasing the operating temperature of the laser diode results in a corresponding decrease in the wavelength of the emitted light. For reference and example purposes only, a theoretical 30 degree Celsius adjustment of the operating temperature of a standard edge emitting Fabret-Perot laser may result in a 10 nm wavelength shift of the emitted light.

With continued reference to FIG. 2, the computing device 12 includes a controller 72, memory 74, and associated mass storage device 76 and power supply 78. Computing device 12 is operably connected to the depth camera 20 to receive three-dimensional information from the depth camera. In other examples, the depth camera 20 may not include a controller or memory, and the controller 72 and memory 74 of the computing device 12 may be used to control the depth camera and thermal management system 100. In still other examples, thermal management system 100 may be embedded in or operably connected to other electronic devices that provide one or more of a power supply, controller, mass storage, and/or memory. Accordingly, the embodiments of the thermal management system 100 described herein are merely illustrative, and other suitable embodiments in other operating contexts may be employed within the scope of the present disclosure.

For efficient operation of the illumination system 18 within the depth camera 20, it is desirable to minimize wavelength shift in the light emitting laser diodes 16. One approach to minimizing such a wavelength shift may be to maintain the operating temperature of the light emitting laser diodes 16 within a desired temperature range.

Figure 3:
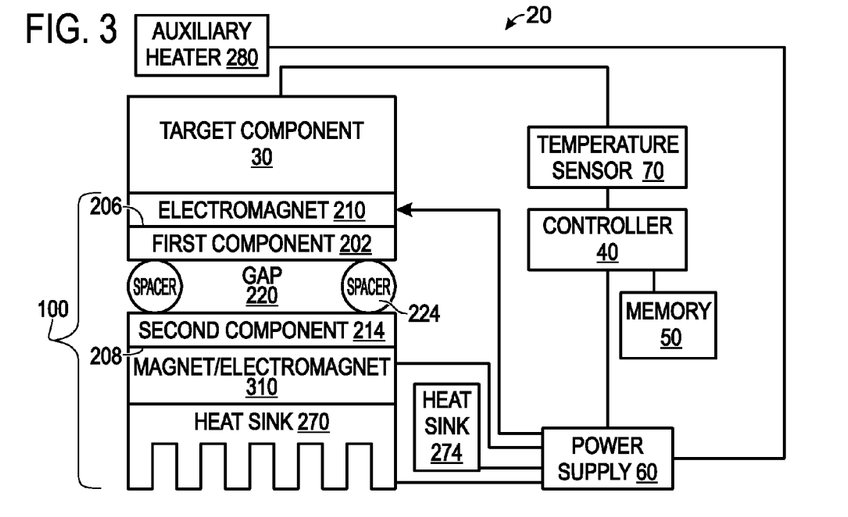
FIG. 3. is a schematic view of the thermal management system of FIG. 2 showing components of the thermal management system according to an embodiment of the present disclosure.

With reference now to FIG. 3, a schematic representation of a target component 30 and the components of the thermal management system 100 is provided. As explained above with reference to FIG. 2, in one example the target component 30 may be one or more light emitting laser diodes 16 within a light source 14.

In one example, thermal management system 100 may include a first component 202 that includes a first surface 206 proximate to the target component 30. A first electromagnet 210 may be disposed between the first surface 206 and the target component 30. The first electromagnet 210 may be comprised of a coil surrounding a ferromagnetic core. In one example, the first electromagnet 210 may have a toroidal shape. As shown in FIG. 3, the first surface 206 of the first component 202 may be proximate to the target component 30 but may not be in contact with the target component. In other embodiments, at least a portion of the first surface 206 may be proximate to and in contact with the target component 30. For example, a width of the first electromagnet 210 may be less than a width of the first component 202, and an outer periphery of the first component and first surface 206 may extend to contact the target component 30.

With continued reference to FIG. 3, a second component 214 may be spaced apart from the first component 202 to form a gap 220. As explained in more detail below, the gap 220 serves as a thermal boundary between the first component 202 and the second component 214. The second component 214 includes a second surface 208 proximate to a heat sink 270.

The heat sink 270 may operate to lower the temperature of the second component 214, and thereby create a larger temperature difference between the second component 214 and the target component 30. As described in more detail below, in this manner the heat sink 270 may selectively enhance heat transfer from the target component 30. In another example an existing heat sink 274 may be present in the electronic component with which the thermal management system 100 is used. In this embodiment, the existing heat sink 274 may be used in addition to or in place of heat sink 270.

In one embodiment, a second magnet 310 may be disposed between the second surface 208 and the heat sink 270. The second magnet 310 may be a permanent magnet or a second electromagnet. In one example, the second magnet 310 may be a permanent magnet, and the controller 40 is configured to selectively control the first electromagnet 210 as described in more detail below. In another example the second magnet 310 is a second electromagnet that is also electrically connected to the power supply 60, and the controller 40 is configured to selectively control the first electromagnet 210 and the second electromagnet as described in more detail below.

As shown in FIG. 3, the second surface 208 of the second component 214 may be proximate to the heat sink 270 but may not be in contact with the heat sink 270. In other embodiments, at least a portion of the second surface 208 of the second component 214 may be proximate to and in contact with the heat sink 270. For example, a width of the second magnet 310 may be less than a width of the second component 214, and an outer periphery of the second component and second surface 208 may extend to contact the heat sink 270.

The first component 202 and the second component 214 may be separated by a spacer 224 that is formed from a material having a first thermal conductivity that is lower than a second thermal conductivity of the first component and the second component. Examples of materials that may be used for the spacer 24 include glass, porcelain, plastic and elastomeric materials. In the example shown in FIGS. 3 and 4, the spacer 224 may be an O-ring formed of an elastomeric material.

Figure 4:
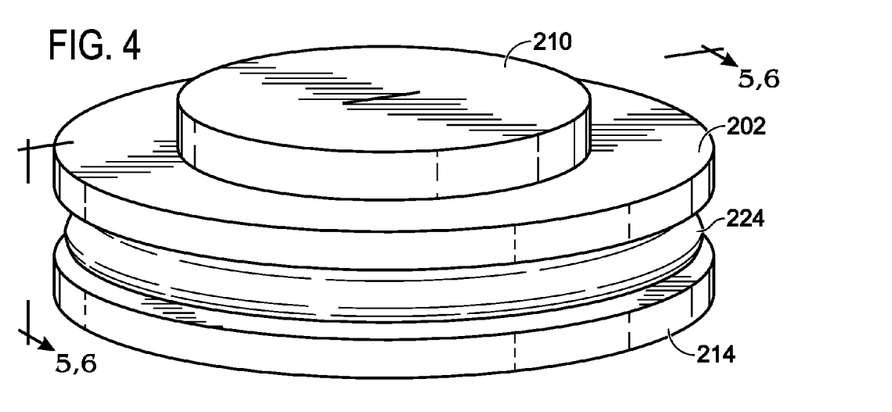
FIG. 4 is a perspective view of the thermal management system of FIG. 3 showing a first thermally conductive component and a second thermally conductive component separated by a spacer, and a magnet proximate to the first conductive component according to an embodiment of the present disclosure.

With reference now to FIG. 4, in one example the first component 202 and the second component 214 may comprise ring-shaped plates positioned opposite to one another. In this embodiment, the first component 202 and second component 214 may be separated by and overlap the spacer 224, which may comprise an elastomeric O-ring. As shown in FIG. 4, in this embodiment the first electromagnet 210 may similarly comprise a ring-shaped plate having a diameter less than the diameter of the first component 202 and second component 214.

The first component 202 and the second component 214 may be formed from a non-ferrous material. As noted above, the first component 202 and the second component 214 are also formed from a material having a second thermal conductivity that is higher than a first thermal conductivity of the spacer 24. Examples of non-ferrous materials that may be used for the first component 202 and the second component 214 include aluminum, zinc and copper.

With continued reference to FIG. 3, the first electromagnet 210 may be electrically connected to power supply 60 for selectively energizing the first electromagnet to generate a magnetic field that propagates through the first component 202 and into the gap 220. The power supply 60 may be operably connected to controller 40 that is configured to selectively control the first electromagnet 210 by providing electric current from the power supply to the first electromagnet. As explained in more detail below, the controller 40 may be operably connected to a temperature sensor 70 that is operably connected to the target component 30. Memory 50 includes program logic instructions stored thereon and executed by the controller 40 to selectively control the power supply 60 to energize the first electromagnet 210 and provide the functionality described herein.

Figure 5:
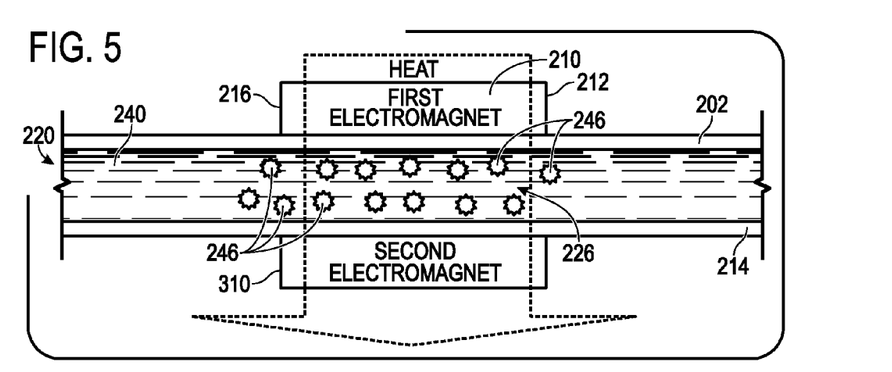
FIG. 5 is a partial cross sectional view of a component stack taken along lines 5,6 of FIG. 4 and showing a thermal management system operating to align thermally conductive particles across a central region of a gap between a first component and a second component according to an embodiment of the present disclosure.
Figure 6:
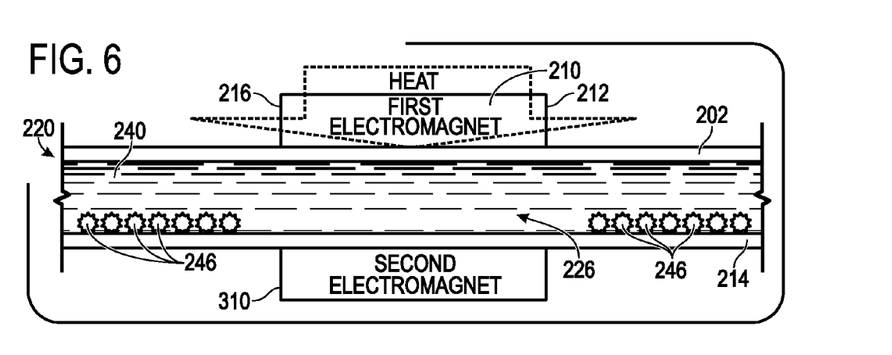
FIG. 6 is a partial cross sectional view of the component stack of FIG. 4 taken along lines 5,6 of FIG. 4 and showing the thermal management system operating to displace thermally conductive particles from a central region of a gap between a first component and a second component according to an embodiment of the present disclosure.

With reference now to FIGS. 5 and 6, disposed with the gap 220 between the first component 202 and the second component 214 is a carrier fluid 240 that includes multiple thermally conductive, ferrous particles 246. In one example, the carrier fluid 240 may comprise a colloidal solution comprising a base fluid and thermally conductive, ferrous nanoparticles suspended within the base fluid. Each of the nanoparticles may have a diameter of between approximately 1-100 nanometers, and may be formed from materials including, but not limited to oxides, carbides, or metal such as iron, magnetite, or hematite.

Base fluids in which the nanoparticles may be suspended include water, ethylene glycol, or other fluids, some of which may have a thermal conductivity lower than water or ethylene glycol. It will be appreciated that the thermal conductivity of the base fluid is less than the thermal conductivity of the thermally conductive, ferrous nanoparticles. For example, ethylene glycol may have a thermal conductivity of approximately 0.25 W/mK, whereas iron may have a thermal conductivity of approximately 80 W/mK. As explained in more detail below, the carrier fluid 240 is configured to align the thermally conductive, ferrous particles 246 across a central region 226 of the gap 220 when the first electromagnet 210 and/or second magnet 310 generates a magnetic field that attracts the particles. The carrier fluid 240 is also configured to displace the particles from the central region 226 of the gap 220 when the first electromagnet 210 and/or second magnet 310 generates a magnetic field that repels the particles.

It will be appreciated that aligning the thermally conductive, ferrous particles 246 across a central region 226 of the gap 220 will enhance heat transfer across the gap and through the carrier fluid 240, whereas displacing the particles from the central region of the gap will inhibit heat transfer across the gap and through the carrier fluid 240. It will also be appreciated that the central region 226 of the gap 220 may be positioned substantially opposite to the first electromagnet 210 and may extend laterally beyond the edges 212 and 216 of the first electromagnet. In another example, the central region 226 of the gap 220 may not extend laterally beyond the edges 212 and 216 of the first electromagnet 210.

With reference also to FIG. 3, the first component 202 and the second component 214 cooperate with the spacer 224 to form a fluidically sealed space, such that the carrier fluid 240 is substantially stationary within the gap 220. In this manner, heat transfer from the first component 202 through the carrier fluid 240 to the target component 30 comprises conductive heat transfer.

With reference now to FIG. 3, it will be appreciated that the temperature of the target component 30 may increase or decrease depending upon various operating conditions and parameters, including but not limited to the duration of operation or non-operation of the target component, and the difference in temperature between the target component and its surroundings. As explained above, in one example the target component 30 may comprise one or more light emitting laser diodes 16 within depth camera 20. As the laser diodes 16 are operated, varying the temperature of the laser diodes will cause the emission wavelength of the emitted light to shift.

Also as noted above, it is desirable to operate the laser diodes 16 within a target operating temperature range to minimize wavelength shift. The target operating temperature range may be between a first threshold temperature and a second threshold temperature. In one example, the first threshold temperature is approximately 42.1 degrees Celsius and the second threshold temperature is approximately 41.9 degrees Celsius. It will be appreciated that other temperatures may be used for the first and second threshold temperatures according to the particular requirements of the target component 30 and its operating conditions. Additionally, in some embodiments the first and second threshold temperatures may be equal. As described in more detail below, the thermal management system 100 may selectively thermally isolate and thermally connect the laser diodes 16 to maintain the laser diodes within the target operating temperature range.

Figure 7:
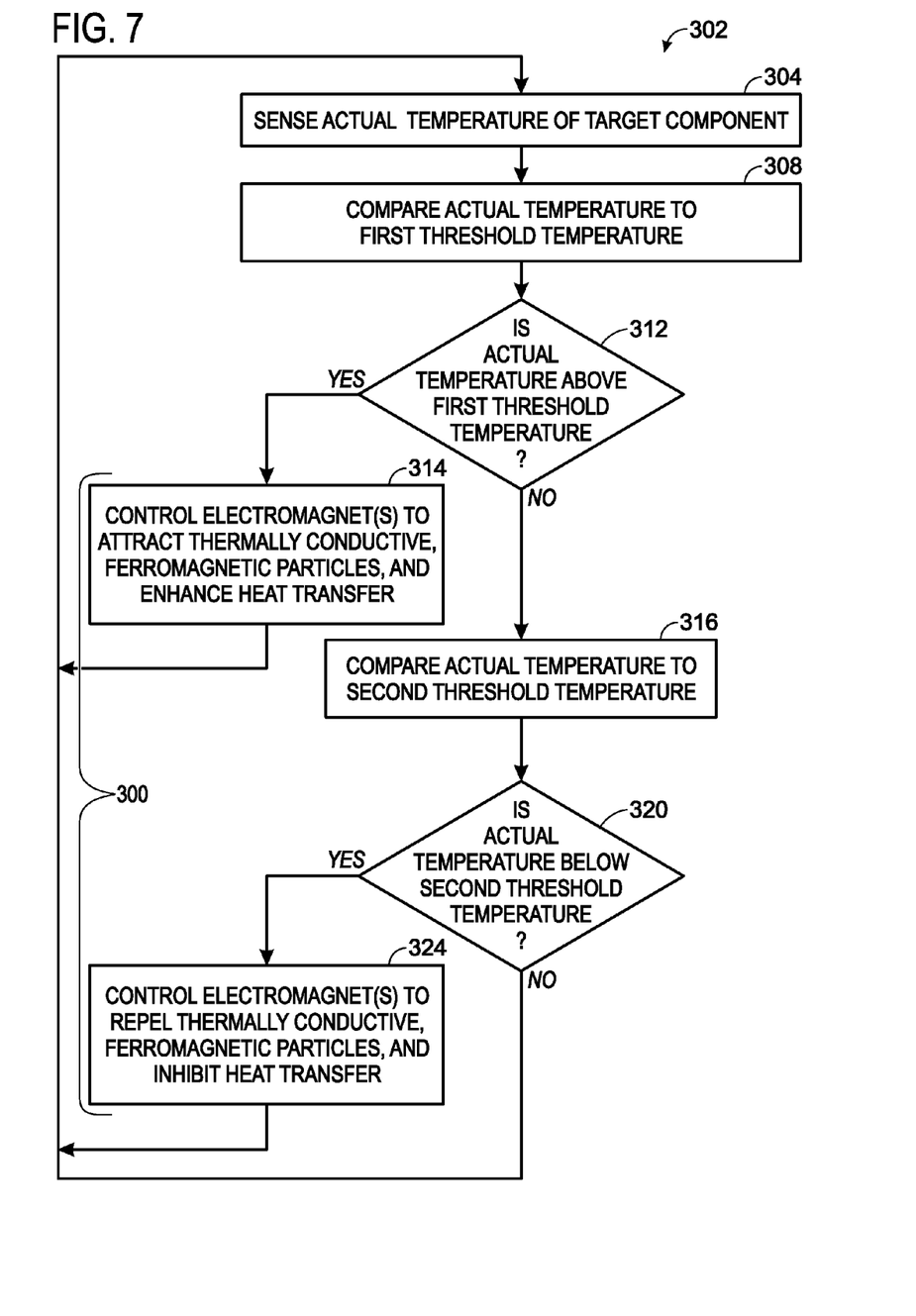
FIG. 7 shows a flow chart for a method of thermally isolating and thermally connecting a target component according to an embodiment of the present disclosure.

Turning now to FIG. 7, and with reference also to the embodiment illustrated in FIGS. 5 and 6, a flow chart is provided for a method for selectively thermally isolating and thermally connecting a target component that generates heat, such as laser diodes 16. The method may comprise a control algorithm in the form of instructions stored in memory 50. The instructions may be executed by controller 40 and performed by the hardware and components illustrated in FIGS. 3, 5 and 6 and described above. It will be appreciated that the method may also be performed by any other suitable hardware, software and/or components.

In one example embodiment beginning with steps 314 and 324 collectively indicated at 328, and where the second magnet 310 is a second electromagnet, a method 328 comprises controlling the first electromagnet 210 and/or second electromagnet to attract and repel thermally conductive, ferrous particles. More specifically, at step 314 the method includes controlling the first electromagnet 210 and/or second electromagnet to generate a magnetic field that attracts the thermally conductive, ferrous particles 246 within the carrier fluid 240, and thereby aligns at least a portion of the particles across the central region 226 of the gap 220. At step 324, the method also includes controlling the first electromagnet 210 and/or second electromagnet to generate a magnetic field that repels the thermally conductive, ferrous particles 246 within the carrier fluid 240, and thereby displaces at least a portion of the particles from the central region 226 of the gap 220 As described above, aligning the thermally conductive, ferrous particles 246 in the manner described will enhance heat transfer from the target component 30 across the gap to the heat sink 270, whereas displacing the particles in the manner described will inhibit heat transfer across the gap and through the carrier fluid 240.

In one example the current flow through the first electromagnet 210 and/or second electromagnet may be at a maximum rating of the electromagnet(s) to generate the strongest possible magnet field(s). In another example the current flow may be modulated to values less than the maximum rating of the first electromagnet 210 and/or second electromagnet to vary the intensity of the magnet field(s) generated by the electromagnet(s). The current flow through the first electromagnet 210 and/or second electromagnet may also be eliminated to produce an absence of a magnetic field.

In another example embodiment beginning with step 304, a method 302 comprises sensing an actual temperature of the target component 30. For example, the temperature sensor 70 may determine an actual temperature of the target component 30 and deliver this information to controller 40. In the next step 308, the actual temperature of the target component is compared to the first threshold temperature. The first threshold temperature, for example, may be stored in memory 50 and accessed by controller 40. Next, at step 312, it is determined whether the actual temperature of the target component is above the first threshold temperature. If the actual temperature of the target component is above the first threshold temperature, then at step 314 the method 300 includes controlling the first electromagnet 210 and/or second electromagnet to generate a magnetic field that attracts the thermally conductive, ferrous particles 246 within the carrier fluid 240 as described above. Following step 314, the method 300 returns to step 304 to again sense the actual temperature of the target component 30.

With reference now to FIGS. 3 and 5, it will be appreciated that attracting the thermally conductive, ferrous particles 246 and aligning the particles across the central region 226 of the gap 220 thermally connects the target component 30 to the heat sink 270 and enhances heat transfer from the target component 30 to the heat sink 270. Such enhanced heat transfer is schematically indicated by the dashed arrow extending through the carrier fluid 240, second component 214 and second electromagnet in FIG. 4. It will be appreciated that at least a portion of the heat transferred from the target component 30 to the heat sink 270 may pass through the first electromagnet 210 and second electromagnet. In another example, at least a portion of the heat transferred from the target component 30 to the heat sink 270 may not pass through the first electromagnet 210 or second electromagnet.

Returning to FIG. 7 and step 312, if the actual temperature of the target component is not above the first threshold temperature, then at step 316 the actual temperature of the target component is compared to a second threshold temperature. The second threshold temperature may also be stored in memory 50 and accessed by controller 40. Next, at step 320 the method determines whether the actual temperature is below the second threshold temperature. If the actual temperature is not below the second threshold temperature, then the method returns to step 304 to again sense the actual temperature of the target component 30. If the actual temperature of the target component 30 is below the second threshold temperature, and with reference now to FIG. 6, then at step 324 the method includes controlling the first electromagnet 210 and/or second electromagnet to generate a magnetic field that repels the thermally conductive, ferrous particles 246 within the carrier fluid 240, and thereby displaces at least a portion of the particles from the central region 226 of the gap 220. Following step 324, the method returns to step 304 to again sense the actual temperature of the target component 30.

With reference now to FIGS. 3 and 6, it will be appreciated that repelling the thermally conductive, ferrous particles 246 and displacing at least a portion of the particles from the central region 226 of the gap 220 thermally isolates the target component 30 from the heat sink 270, and inhibits heat transfer from the target component 30 to the heat sink 270. As noted above with respect to the carrier fluid 240, the thermal conductivity of the base fluid is less than the thermal conductivity of the thermally conductive, ferrous particles suspended within the base fluid. Thus, displacing the particles from the central region 226 of the gap 220 leaves primarily only the base fluid within the central region of the gap, which serves to inhibit heat transfer across the gap. Such inhibited heat transfer is schematically indicated by the dashed arrow extending only to the first component 202 in FIG. 6.

By inhibiting heat transfer across the gap 220 and thermally isolating the target component 30 from the heat sink 270, the temperature of the target component 30 may rise by virtue of heat generated by the target component or heat transferred to the target component from other heat sources within the surrounding environment. With reference to FIG. 3, in one embodiment an auxiliary heater 280 may be utilized to provide supplemental heat transfer to the target component 30 as desired. In one example use case, the depth camera 20 that includes the laser diodes 16 may be transported through and/or used in an environment with an ambient temperature well below the desired operating temperature range of the laser diodes. In this example, the target component 30 may be thermally isolated from the heat sink 270 as described above, and the auxiliary heater 280 may be utilized to heat the laser diodes 16 and reduce the time required to raise the temperature of the laser diodes to within their desired operating temperature range.

In another example, the carrier fluid 240 may comprise a ferrofluid in which the entire fluid moves in response to the magnetic field(s) generated by the first electromagnet 210 and second electromagnet. In this example, when the ferrofluid is repelled and displaced from the central region 226 of the gap 220, the central region is filled by air or vacuum that thermally isolates the target component 30 from the heat sink 270, and inhibits heat transfer from the target component 30 to the heat sink 270.

In another example, the carrier fluid 240 may comprise air and the thermally conductive, ferrous particles may comprise iron filings. In this example, when the iron filings are repelled and displaced from the central region 226 of the gap 220, the central region is filled by air that thermally isolates the target component 30 from the heat sink 270, and inhibits heat transfer from the target component 30 to the heat sink 270.

It will be appreciated that the example embodiments described above are provided only for descriptive purposes, and that the thermal management systems and related methods and processes described may be used with any suitable target component and/or in any suitable operating environments within the scope of the present disclosure. Other examples of target components include electronic circuits, devices and components, and optoelectronic circuits, devices and components. Other example operating environments include mobile computing devices, client computing devices, server computing devices, display devices, and other electronic devices that include components operating within a desired temperature range. In these examples, one or more of the components and/or processes described above may be existing in or provided by the host electronic system in the operating environment.

It is to be understood that the configurations and/or approaches described herein are exemplary in nature, and that these specific embodiments or examples are not to be considered in a limiting sense, because numerous variations are possible. The specific methods described herein may represent one or more of any number of processing steps. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A thermal management system for selectively thermally isolating and thermally connecting a target component, comprising:
    a first component having a first surface proximate to the target component;
    a first electromagnet between the first surface and the target component;
    a second component spaced apart from the first component;
    a gap serving as a thermal boundary between the first component and the second component;
    a carrier fluid disposed within the gap and including multiple thermally conductive, ferrous particles, the carrier fluid being configured to align at least a portion of the thermally conductive, ferrous particles across a central region of the gap when the first electromagnet generates a magnetic field that attracts the particles, and to displace at least a portion of the particles from the central region of the gap when the first electromagnet generates a magnetic field that repels the particles, the carrier fluid and the first electromagnet operating to selectively thermally connect and thermally isolate the target component.

2. The system of claim 1, further including a magnet proximate to the second component.

3. The system of claim 2, wherein the magnet proximate to the second component is a permanent magnet.

4. The system of claim 2, wherein the magnet proximate to the second component is a second electromagnet.

5. The system of claim 4, further including:
   a power supply configured to supply power to the first electromagnet and the second electromagnet; and
   a controller operably connected to the power supply and configured to selectively control the first electromagnet and the second electromagnet to either attract at least a portion of the thermally conductive, ferrous particles and align the particles across the central region of the gap, or to repel at least a portion of the thermally conductive, ferrous particles and displace the particles from the central region of the gap.

6. The system of claim 5, further comprising instructions executed by the controller to selectively control the power supply to energize the first electromagnet to generate a magnetic field that either aligns the thermally conductive, ferrous particles across the central region of the gap, or displaces the thermally conductive, ferrous particles from the central region of the gap.

7. The system of claim 1, further including a heat sink proximate to the second component.

8. The system of claim 1, wherein the first component and the second component are ring-shaped.

9. The system of claim 1, wherein the first component and the second component are comprised of a non-ferrous material, and further comprising a spacer between the first component and the second component, the spacer having a first thermal conductivity that is lower than a second thermal conductivity of the first component and the second component.

10. The system of claim 9, wherein the spacer comprises an elastomeric O-ring.

11. The system of claim 1, wherein the target component is a laser diode in a depth camera used in a gaming system.

12. A method for selectively thermally isolating and thermally connecting a target component that generates heat, comprising:
    controlling a first electromagnet to attract thermally conductive, ferrous particles within a carrier fluid and align at least a portion of the particles across a central region of a gap between the target component and a heat sink that is spaced apart across the gap from the target component to enhance heat transfer from the target component to the heat sink, and
    controlling the first electromagnet to repel the thermally conductive, ferrous particles and displace at least a portion of the particles from the central region of the gap between the target component and the heat sink to inhibit heat transfer from the target component to the heat sink.

13. The method of claim 12, further comprising the steps of:
    sensing an actual temperature of the target component;
    comparing the actual temperature of the target component to a first threshold temperature; and
    if the actual temperature is above the first threshold temperature, controlling the first electromagnet to attract at least a portion of the thermally conductive, ferrous particles and enhance heat transfer from the target component to the heat sink.

14. The method of claim 13, further comprising the steps of:
    comparing the actual temperature of the target component to a second threshold temperature; and
    if the actual temperature is below the second threshold temperature, controlling the first electromagnet to repel at least a portion of the thermally conductive, ferrous particles and inhibit heat transfer from the target component to the heat sink.

15. The method of claim 12, wherein a permanent magnet is proximate to the heat sink.

16. The method of claim 15, wherein:
    controlling a first electromagnet to attract thermally conductive, ferrous particles further comprises controlling the first electromagnet in combination with the permanent magnet to attract the thermally conductive, ferrous particles within the carrier fluid and align at least a portion of the particles across the central region of the gap between the target component and the heat sink that is spaced apart across the gap from the target component to enhance heat transfer from the target component to the heat sink, and
    controlling a first electromagnet to repel the thermally conductive, ferrous particles further comprises controlling the first electromagnet in combination with the permanent magnet to repel the thermally conductive, ferrous particles and displace at least a portion of the particles from the central region of the gap between the target component and the heat sink to inhibit heat transfer from the target component to the heat sink.

17. The method of claim 13, wherein a second electromagnet is proximate to the heat sink.

18. The method of claim 17, further comprising the step of, if the actual temperature is above the first threshold temperature, controlling the first electromagnet and the second electromagnet to attract at least a portion of the thermally conductive, ferrous particles and enhance heat transfer from the target component to the heat sink.

19. The method of claim 18, further comprising the steps of:
    if the actual temperature is below a second threshold temperature, controlling the first electromagnet and the second electromagnet to repel at least a portion of the thermally conductive, ferrous particles and inhibit heat transfer from the target component and the first component to the second component.

20. A thermal management system for selectively thermally isolating and thermally connecting a laser diode in a depth camera to a heat sink, comprising:
    a first thermally conductive component having a first surface proximate to the laser diode;
    a first electromagnet between the first surface and the laser diode;
    a second thermally conductive component spaced apart from the first component, the second component proximate to the heat sink;
    a second electromagnet proximate to the second component;
    a gap serving as a thermal boundary between the first component and the second component;
    a carrier fluid disposed within the gap and including multiple thermally conductive, ferrous particles, the carrier fluid being configured to align at least a portion of the thermally conductive, ferrous particles across a central region of the gap when the first electromagnet and the second electromagnet generate a magnetic field that attracts the particles, and to displace at least a portion of the particles from the central region of the gap when the first electromagnet and the second electromagnet generate a magnetic field that repels the particles;

a power supply configured to supply power to the first electromagnet and the second electromagnet; and a controller operably connected to the power supply and configured to selectively control the first electromagnet and the second electromagnet to either attract at least a portion of the thermally conductive, ferrous particles and enhance heat transfer from the laser diode to the heat sink, or to repel at least a portion of the thermally conductive, ferrous particles and inhibit heat transfer from the laser diode to the heat sink.

\* \* \* \* \*